3,190,845
COAL TAR COATING COMPOSITION
Robert H. Goodnight, Kansas City, Mo., assignor to Cook Paint & Varnish Company, Kansas City, Mo., a corporation of Delaware
No Drawing. Filed Jan. 30, 1961, Ser. No. 85,472
4 Claims. (Cl. 260—28)

The present invention relates to a novel coal tar coating composition.

Broadly speaking, the coating composition of the invention comprises a dry, granular mixture including, as the essential components therein, a hard coal tar pitch, solid epoxy resin and at least one solid epoxy curing agent. This particulate or granular mixture is cold stable but can be cured into a crosslinked product having corrosion resistance and other desirable characteristics when heated to its melting point or above, e.g. 300° F.

Solid coal tar pitch for use herein is available commercially. This type of pitch is essentially hydrocarbon in composition and is substantially insoluble in such solvents as ethanol and aqueous alkali.

Any available solid epoxy resins, i.e. glycidyl polyether resin, may be used herein. Glycidyl polyether resins are well known (see, for example U.S. Patent 2,528,417) and are characterized by containing more than one epoxy group

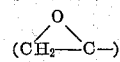

in the average molecule. Typically suitable epoxy resins for use herein include the products known as Epon 1001, 1002, 1004 and 1007, which are products made and sold by Shell Development and may be chemically identified as diglycidyl ethers of bisphenol A, having average molecular weights between about 900 and 2900 and having epoxide equivalents of 450–525, 550–700, 870–1025 and 1650–2050, respectively.

In addition to the coal tar pitch and epoxy resin, the compositions of the invention include any solid epoxy curing agent which is triggered only at an elevated temperature at about the melting point of the mixture or above to effect crosslinking and curing of the epoxy resin. Desirably, the effective range of the curing agent is between 250° F. to 450° F. Typically suitable curing agents are solid aromatic acid anhydrides, particularly pyromellitic dianhydride, chlorodenic anhydride, and dichloromaleic anhydride. Other suitable curing agents are metaphenyl diamine, dicyandiamide, 4,4'-methylene dianiline, masked isocyanates, phenolic resins, urea formaldehyde resins, and aniline formaldehyde resins. Of these, metaphenylene diamine is a preferred curing agent. Other less reactive anhydrides which may be used include phthalic and/or maleic anhydride. In order to secure very rapid curing properties, the formulation may also include a low-temperature accelerator for the promotion of epoxy polymerization, e.g. benzyldiethylamine, benzyltrimethylammnoium hydroxide, as well as primary, secondary, and tertiary amines.

The composition of the invention may be prepared by grinding together the various solid components in a ball mill or the like. If desired, a granular filler such as talc may also be incorporated therein.

The average particle size of the ground mixture may be fairly widely varied but usually should be in the range of about 0.001 to 0.024 inch, preferably 0.002 to 0.012 inch, for most effective use in the fluidized operations discussed hereinafter. Usually, the mixture will comprise from 20 to 60 parts epoxy resin and from 40 to 80 parts pitch based on 100 parts by weight of the resin/pitch mixture. The curing agent or agents may comprise from 1.5 to 100 parts per 100 parts by weight of the epoxy resin.

As indicated, the composition of the invention is a dry, ground formulation which is stable at normal temperatures (e.g. 65–75° F.) and can, therefore, be stored indefinitely as a one-package unit for as long as may be desired. Accordingly, the present formulation is distinguishable from the usual type of coal tar-epoxy formulations which are cold setting and must be made up in two component parts, one containing the curing agent and the other the epoxy resin, in order to avoid premature curing or set.

One of the unique advantages of the present coating formulation is its suitability for application in the dry state to steel products such as steel pipe, structural steel, etc., using a fluidized bed method of application. This may be accomplished according to the invention by providing a fluidized bed of the granular formulation described above in an appropriate treating vessel. Any fluidizing gas which is essentially inert at the temperatures employed, e.g. nitrogen or air, may be used to prepare the bed. The pressure of the gas may vary greatly depending on the coating material and other operating factors but should not exceed the point where there is any appreciable dust cloud of coating material above the bed. Generally, the gas pressure will be in the neighborhood of about 0.015 to about 15 atmospheres and the gas consumption will normally be within the range of 50 to about 750 cubic feet per hour.

The fluidized bed should be kept at a temperature below the melting temperature of the coating material. The bed may be operated at normal atmospheric temperature (e.g. 65–75° F.) or, if desired, the temperature of the bed may be somewhat increased to minimize the possibility of moisture accumulation in the bed. This may be done by raising the temperature of the gaseous medium.

The steel product to be coated is first preheated in any convenient fashion to a temperature above the melting and curing temperature of the granular coating composition. Typically, the steel may be heated to 250° to 450° F., depending, of course, on the melting point and curing point of the particular coating formulation which may be involved.

After the preheating step, the heated steel or like article is at least partially immersed in the fluidized bed. In order to obtain optimum results, the article is kept in motion during the immersion period as by moving it in either a horizontal or vertical direction. Individual particles of the coating material adhere to the article, melt and fuse together with other particles on the hot surface of the article to form a continuous coating of crosslinked, cured resin.

Usually, it is sufficient to keep the steel or other article to be coated immersed in the bed for less than about 50 seconds, preferably less than about 30 seconds. Typical immersion times are from 3 to 15 seconds although times outside this range may also be used depending on other operating factors and, if desired, the article may be immersed in the bed several times to give a coating of any desired thickness.

When the article is withdrawn from the bed, it initially appears covered with powder. However, after a short time, the powder melts to give a continuous coating as a result of heat transfer from the heated article.

Any conventional fluidizing apparatus may be used to carry out the process of the invention. This will usually comprise a vessel for maintaining the bed, including a ceramic partition in the lower portion thereof through which the fluidizing gas is fed upwardly into the particulate coating composition. Various means may be used for immersing the preheated steel or the like into the fluidized bed. Thus, it is possible to use a pair of tongs or the like with which the article is manually dipped into the bed, moved to and fro therein and then withdrawn. Alternatively, automatic or semi-automatic means may be used for this purpose.

The term "fluidized bed" is used herein in its conventional sense to mean a mass of solid particles which exhibits liquid-like characteristics of mobility hydrostatic pressure, etc. This phenomena is now well understood by those in the art and in this connection, reference is made to paper entitled "Fluidization Nomenclature and Symbols," pages 1249–1250, in Industrial and Engineering Chemistry, volume 41, No. 6, June 1949.

The invention is illustrated but not limited by the following examples wherein parts are by weight unless otherwise stated:

Example 1

A coating formulation was prepared as follows:

406 parts of coal tar pitch and 479 parts of solid epoxy resin (specifically the product available as Epon 1007) were heated together and stirred until a homogeneous liquid was formed. To the hot epoxy-coal tar mixture was added 26 parts of inert mineral fillers (e.g. talc) and the mixture agitated until the fillers were uniformly distributed throughout the mixture. The mixture was then poured into shallow trays to cool and resolidify.

After resolidification, the epoxy-coal tar mixture was broken into small aggregates (cross section dimension approximately ¼") and transferred to a porcelain ball mill. To the mixture in the porcelain ball mill was added 75 parts of metaphenylene diamine. The epoxy-coal tar pitch mixture and the metaphenylene diamine were then ground until they were uniformly blended and the resultant particle was mainly in the .002 to .010 inch particle size range. The mixture had a melting point of about 325° F. and a curing temperature of about 300° F.

About 250 parts of this mixture were then placed in an appropriate fluidizing vessel where the mixture was formed into a fluidized bed at 75° F., using air fed into the bottom of the vessel at 1.5 atmospheres pressure as the fluidizing means. The fluidizing gas was fed into the vessel at the rate of 100 cubic feet per hour, sufficient to keep the bed in the fluidized or boiling bed state.

A steel plate 1" x 6" x ¼ was first preheated in an oven to about 400° F. The hot plate was then immersed in the fluidized bed for about 3 seconds. The plate was then withdrawn and the particles adhering thereto fused and coalesced to form a uniform, continuous corrosion resistant coating about .020–.030 inch thick.

Example II

Example I was repeated on a steel pipe using dicyandiamide as the curing agent and Epon 1002 as the epoxy resin to give a highly satisfactory protective coating on the pipe.

It will be appreciated from the foregoing that various modifications may be made in the invention described herein without deviating from the scope thereof. As a typical illustration, one or more resinous plasticizers compatible with the epoxy-coal tar pitch mixture such as polysulfides, polyesters, various elastomers, and others obvious to those skilled in the art may be incorporated to improve the elasticity of the coating or film.

The incorporation of such fillers as digested coal to facilitate film plasticization is also contemplated and embraced by the present invention. Thus, for example, the talc filler used in Example I above may be replaced entirely or in part by the digested coal filler.

It is also visualized that the formulations of the invention may include, either as partial or complete substitutes for the coal tar pitch, or in addition thereto, mined or petroleum derived asphaltic pitches, wood pitches, or other residual pitches, which are compatible with the present formulations and inventive concepts. Accordingly, the scope of the invention is defined in the following claims wherein I claim:

1. A coating composition consisting essentially of a cold stable, dry granular mixture of hard coal tar pitch, solid glycidyl polyether resin and solid epoxy curing agent, said curing agent being active only at an elevated temperature which is at least as high as the melting point of said mixture, said mixture having a melting point and curing point of at least 250° F. and including from 20 to 60 parts resin and from 40 to 80 parts of pitch based on 100 parts by weight of the resin/pitch total and from 15 to 100 parts curing agent per 100 parts of resin.

2. The composition of claim 1, said composition having a melting point and curing point within the range of 250° to 450° F.

3. The composition of claim 2 wherein said composition has an average particle size of from about 0.001 to 0.024 inch.

4. The composition of claim 1 including a solid filler.

References Cited by the Examiner

UNITED STATES PATENTS

| | | | |
|---|---|---|---|
| 2,765,288 | 10/56 | Whittier et al. | 260—28 |
| 2,844,489 | 7/58 | Gemmer | 117—21 |
| 2,906,720 | 9/59 | Simpson | 260—28 |
| 2,921,923 | 1/60 | Bruin et al. | 260—47 |
| 2,997,776 | 8/61 | Matter et al. | 117—21 |
| 3,012,486 | 12/61 | Newey | 260—28 |
| 3,015,635 | 1/62 | Bradley | 260—284 |

OTHER REFERENCES

Abrahams: Historical Review, Asphalt and Allied Substances, published September 1960, Van Nostrand, pages 60 and 61.

Brooks: Metal Products Manufacturing, October 1959, pages 34, 35, 39.

Pascoe: Materials in Design Engineering, February 1961, pages 91-95.

WILLIAM D. MARTIN, *Primary Examiner.*

JOSEPH B. SPENCER, RICHARD D. NEVIUS,
*Examiners.*